(12) United States Patent
Leng

(10) Patent No.: US 12,460,976 B2
(45) Date of Patent: Nov. 4, 2025

(54) INTEGRATED THERMOCOUPLE

(71) Applicant: Microchip Technology Incorporated, Chandler, AZ (US)

(72) Inventor: Yaojian Leng, Vancouver, WA (US)

(73) Assignee: Microchip Technology Incorporated, Chandler, AZ (US)

( * ) Notice: Subject to any disclaimer, the term of this patent is extended or adjusted under 35 U.S.C. 154(b) by 395 days.

(21) Appl. No.: 18/120,093

(22) Filed: Mar. 10, 2023

(65) Prior Publication Data
US 2023/0392992 A1    Dec. 7, 2023

Related U.S. Application Data

(60) Provisional application No. 63/349,322, filed on Jun. 6, 2022.

(51) Int. Cl.
*G01K 7/02* (2021.01)
*H10N 19/00* (2023.01)

(52) U.S. Cl.
CPC ............ *G01K 7/021* (2013.01); *H10N 19/00* (2023.02); *G01K 7/028* (2013.01)

(58) Field of Classification Search
CPC ......... G01K 7/021; G01K 7/028; H01N 19/00
USPC ....................................................... 374/179
See application file for complete search history.

(56) References Cited

U.S. PATENT DOCUMENTS

| | | | | |
|---|---|---|---|---|
| 2005/0034749 A1* | 2/2005 | Chen | ............... | G01K 7/028 374/E7.016 |
| 2009/0189285 A1 | 7/2009 | Colt, Jr. | ............... | 257/756 |
| 2011/0241155 A1* | 10/2011 | Trifonov | ............... | H10N 19/00 257/E21.59 |
| 2013/0188667 A1* | 7/2013 | Edwards | ............... | H10N 19/00 257/467 |
| 2014/0183533 A1 | 7/2014 | Cheramy | ............... | 257/48 |
| 2023/0157175 A1* | 5/2023 | Edwards | ............... | H10D 30/603 257/470 |

FOREIGN PATENT DOCUMENTS

WO    2009/088411 A1    7/2009    ............... G01K 1/02

OTHER PUBLICATIONS

International Search Report and Written Opinion, Application No. PCT/US2023/024508, 13 pages, Sep. 7, 2023.

\* cited by examiner

*Primary Examiner* — Mirellys Jagan
(74) *Attorney, Agent, or Firm* — SLAYDEN GRUBERT BEARD PLLC

(57) ABSTRACT

A system includes a metal tub structure formed in an integrated circuit (IC) structure, a first metal component, and a second metal component. The first metal component is formed from a first metal. The first metal component is formed in an opening defined by the metal tub structure, and includes a first metal first junction element, a first metal second junction element, and a first metal bridge electrically connected to the first metal first junction element and the first metal second junction element. The second metal component is formed from a second metal different than the first metal, and includes a second metal first junction element electrically connected to the first metal first junction element to define a first thermocouple junction, and a second metal second junction element electrically connected to the first metal second junction element to define a second thermocouple junction.

14 Claims, 16 Drawing Sheets

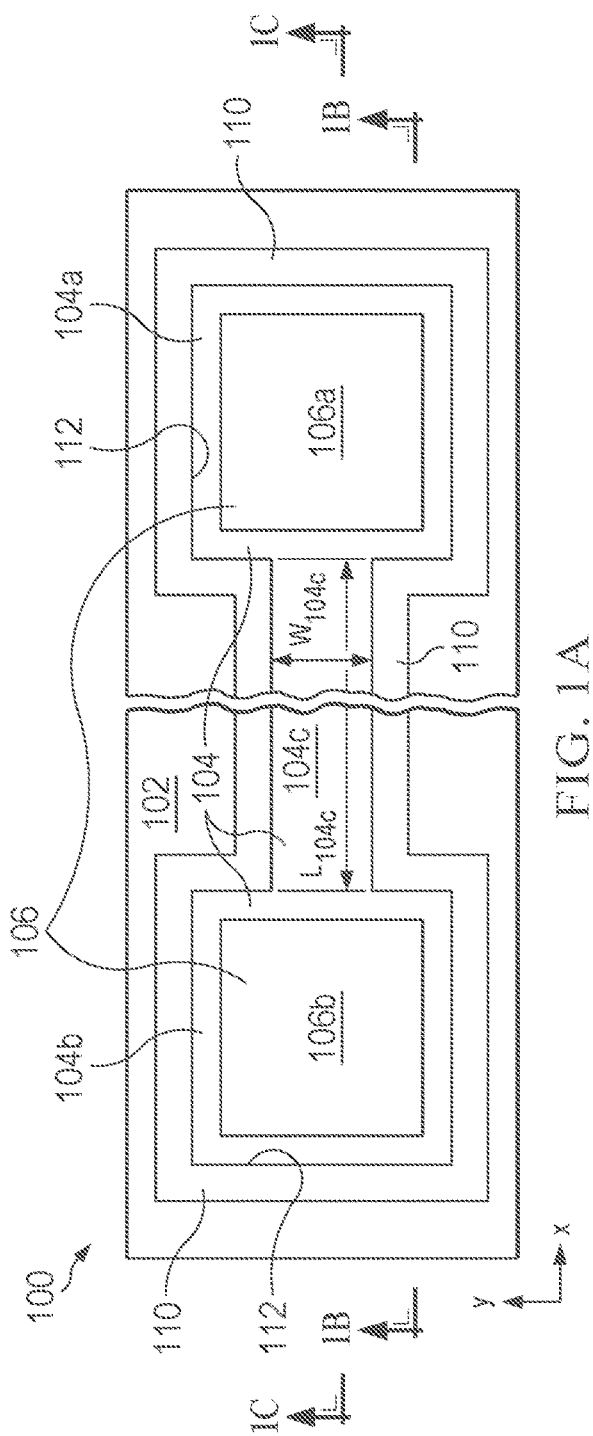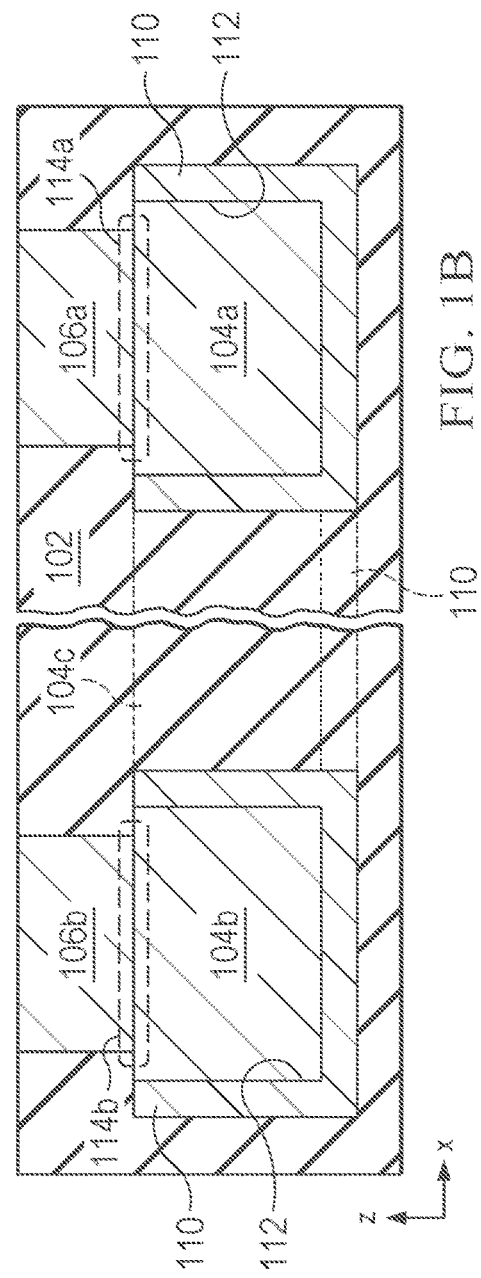
FIG. 1A
FIG. 1B

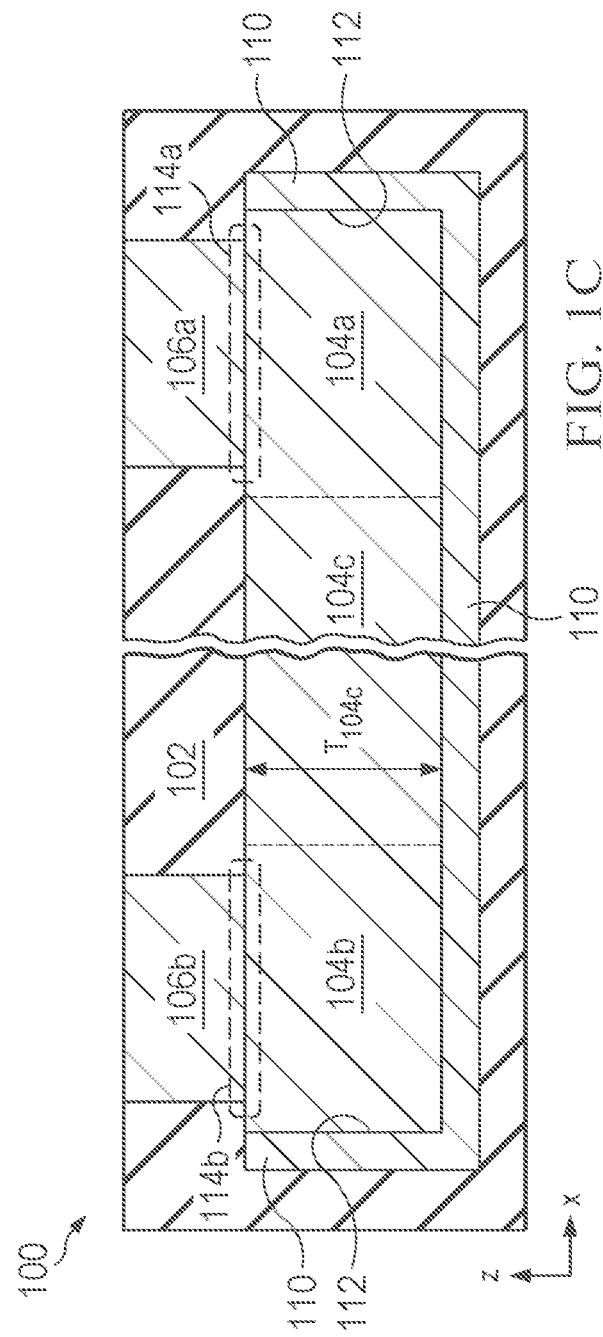

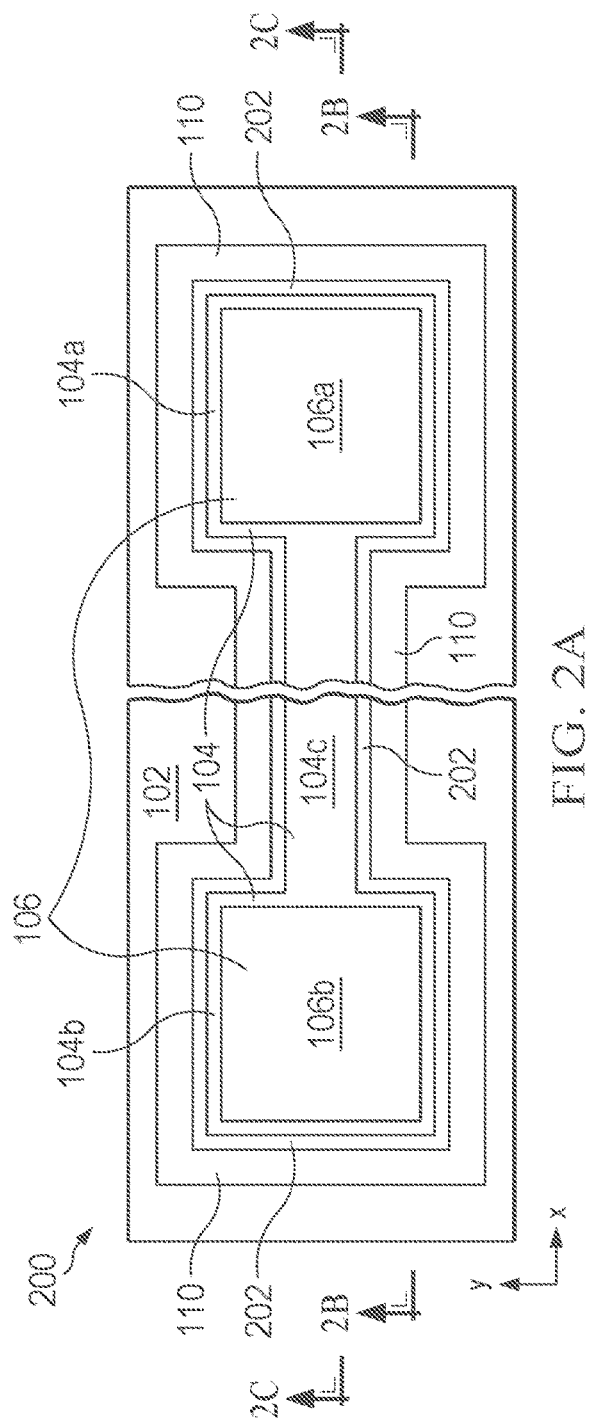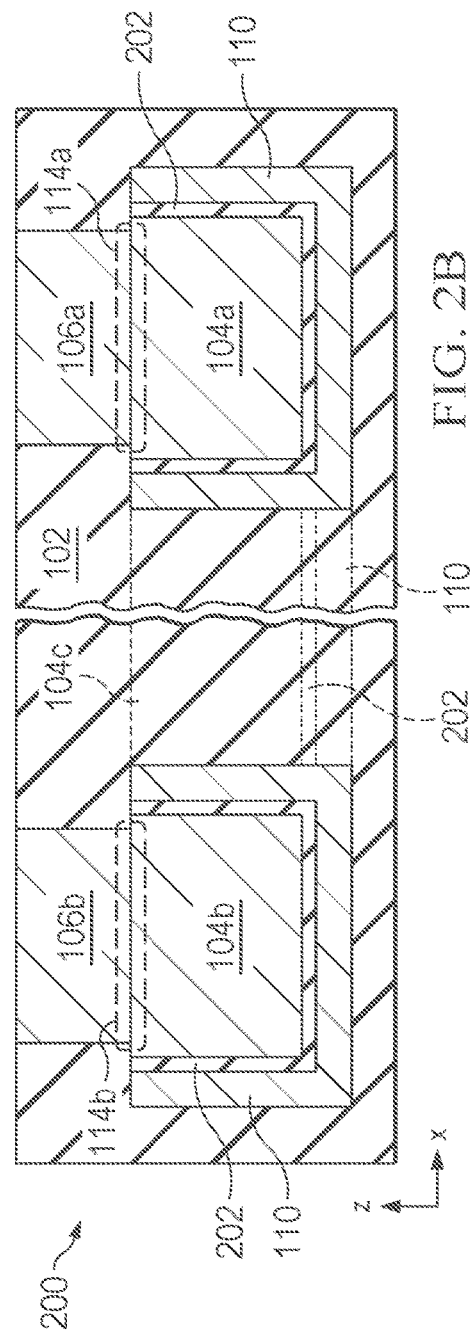

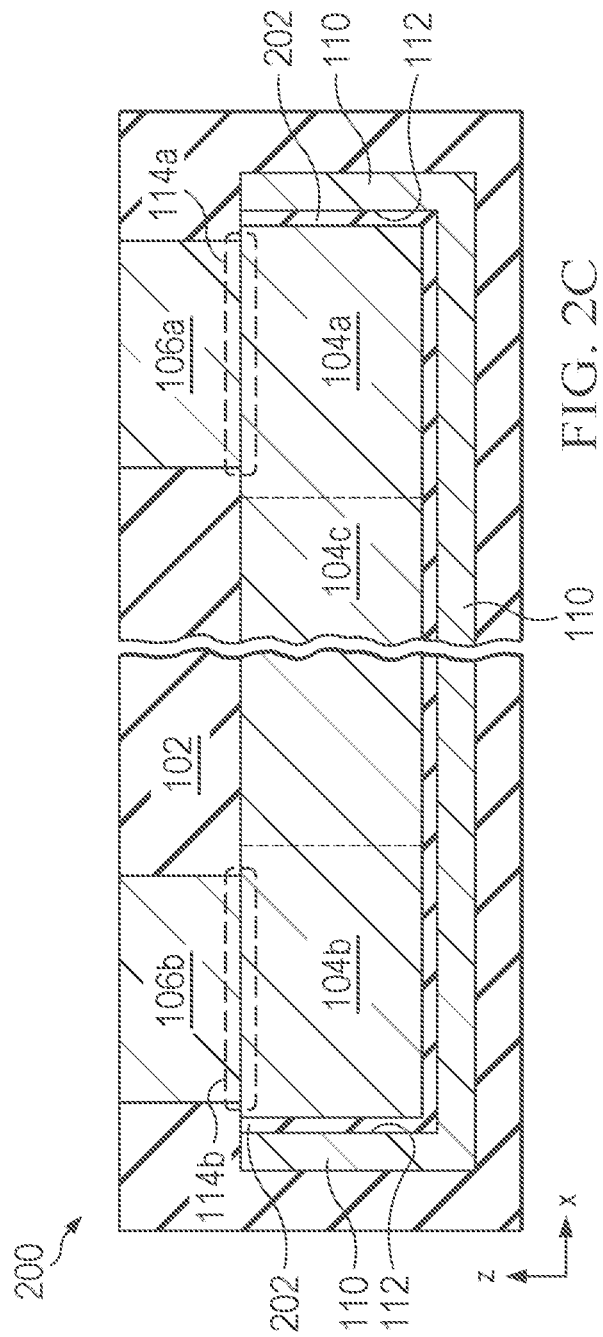

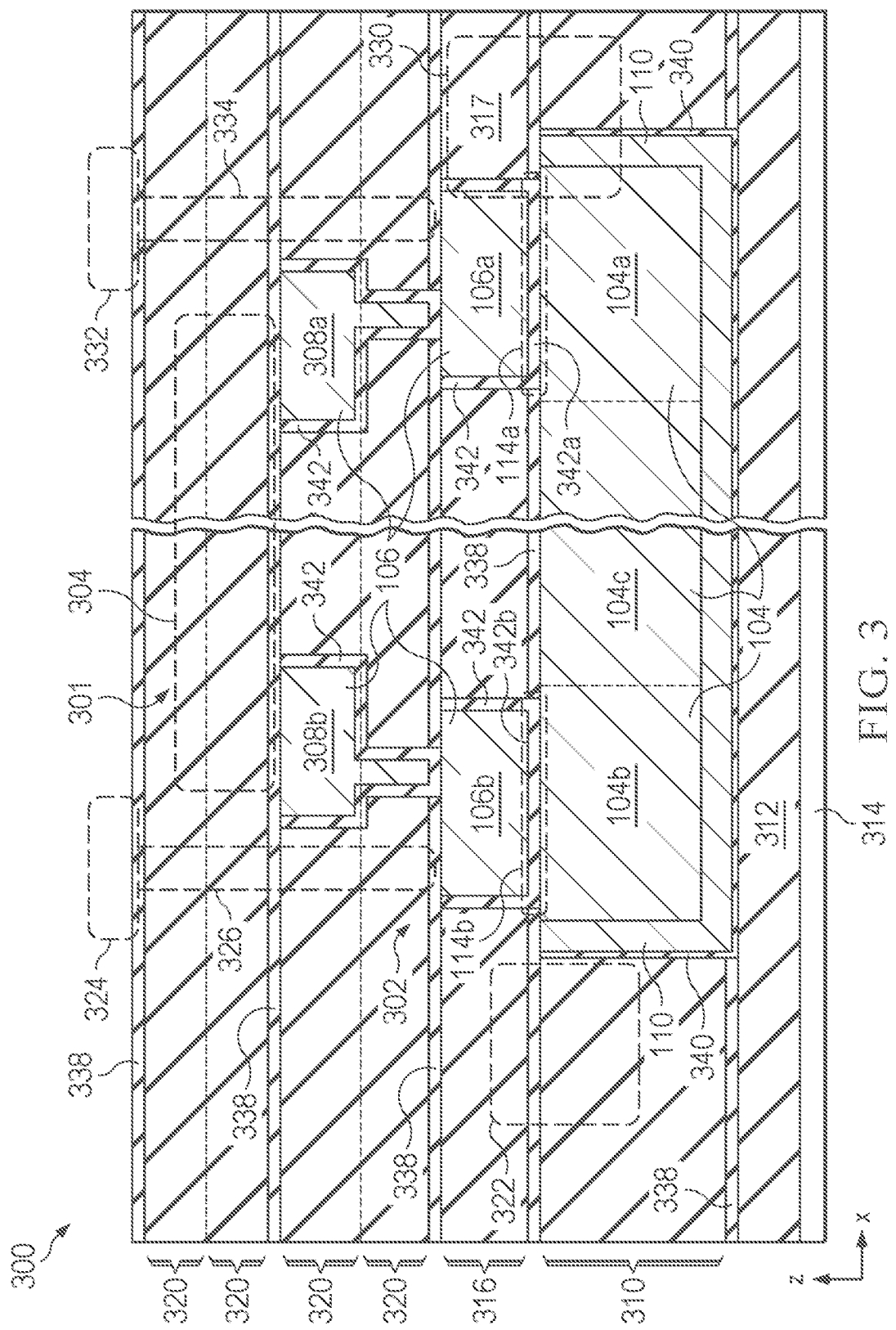

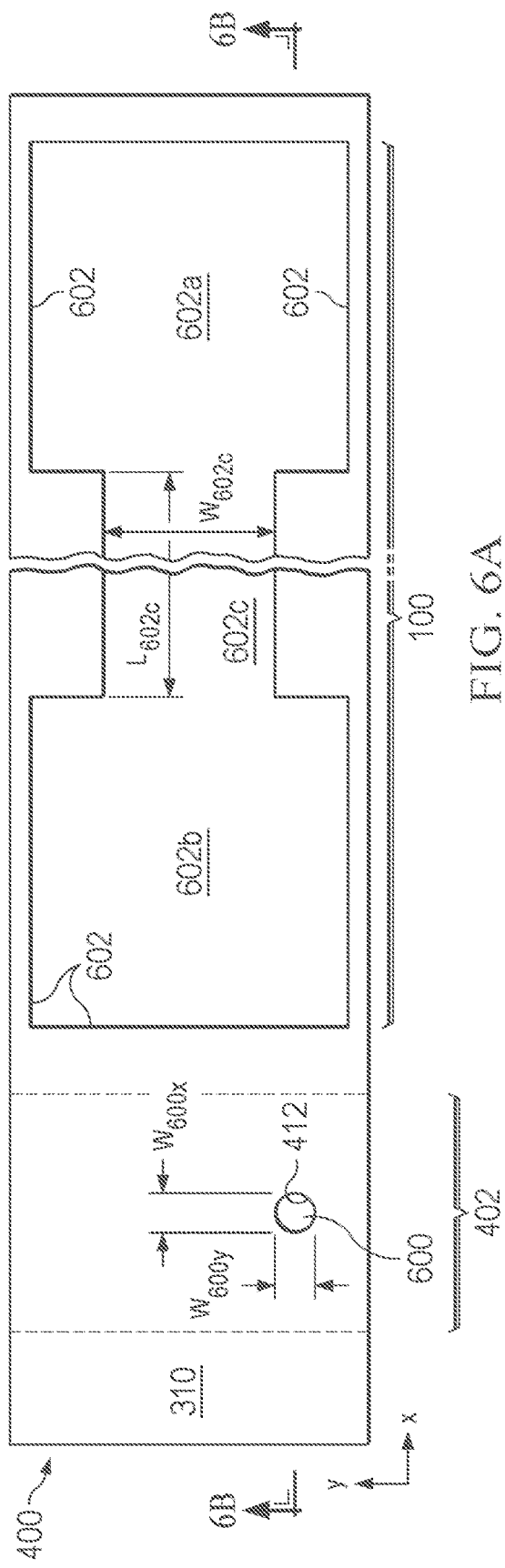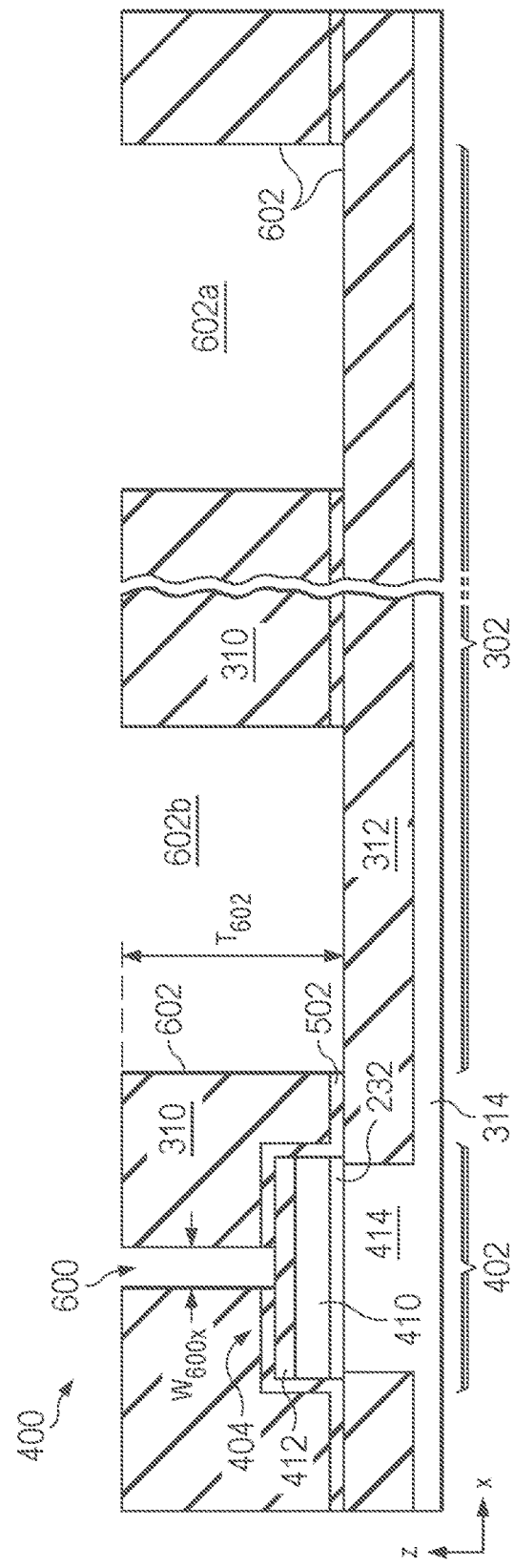
FIG. 6A
FIG. 6B

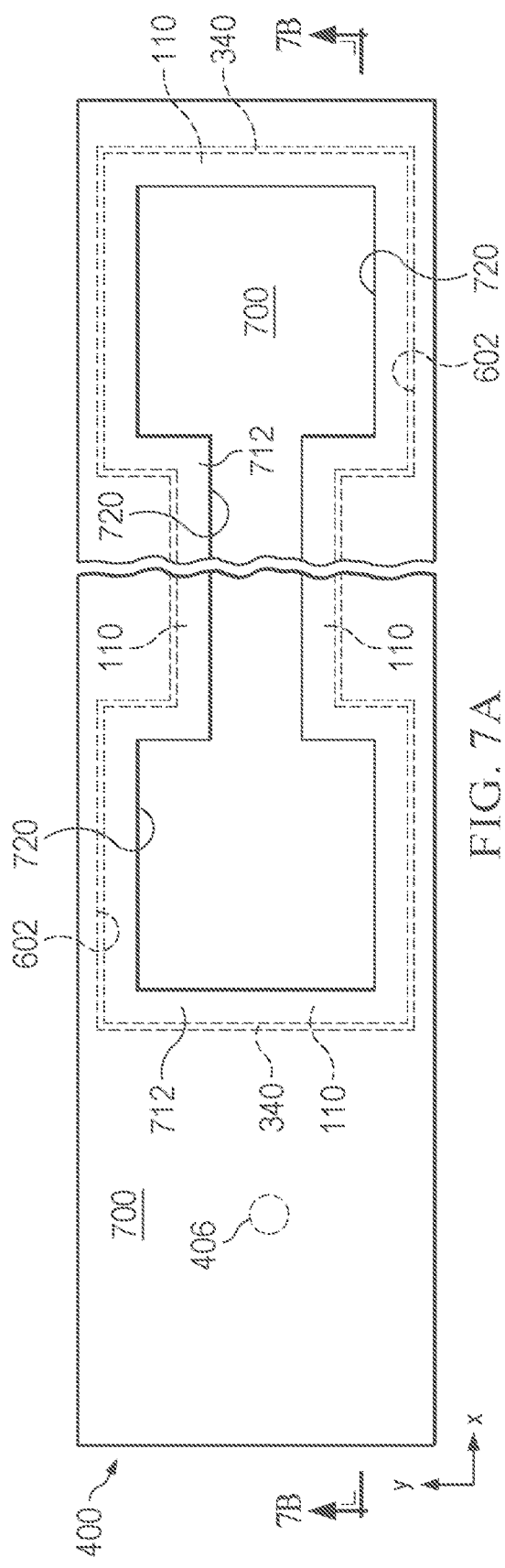
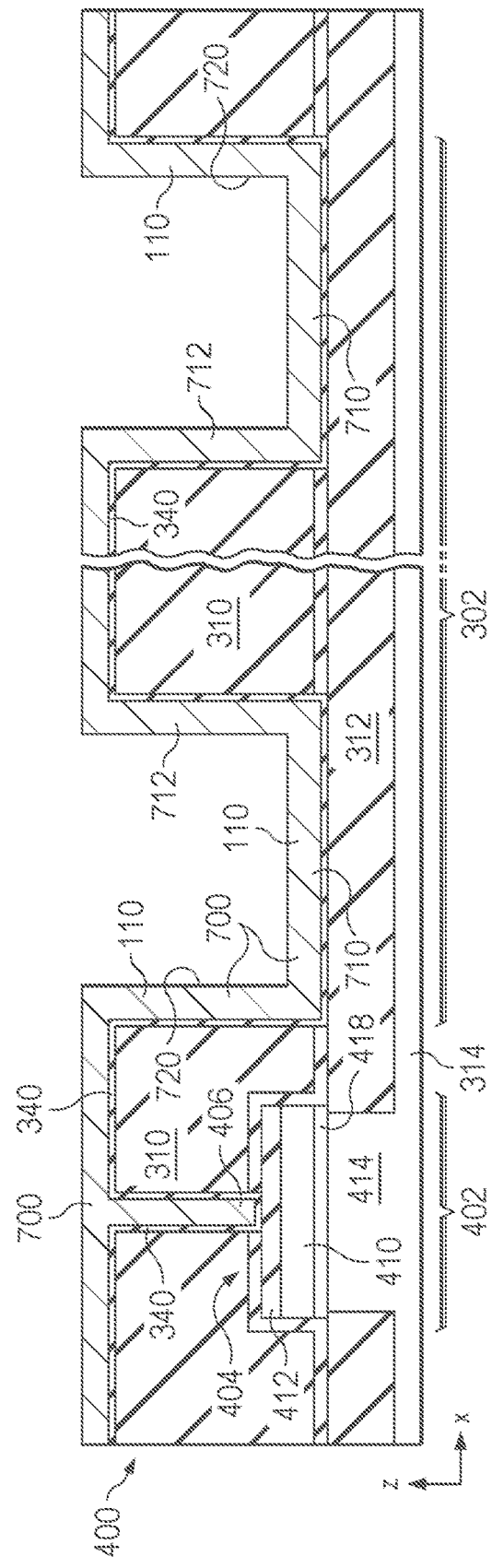
FIG. 7A
FIG. 7B

INTEGRATED THERMOCOUPLE

RELATED APPLICATION

This application claims priority to commonly owned U.S. Provisional Patent Application No. 63/349,322 filed Jun. 6, 2022, the entire contents of which are hereby incorporated by reference for all purposes.

TECHNICAL FIELD

The present disclosure relates to thermocouple devices, and more particularly, to a thermocouple device formed in an integrated circuit.

BACKGROUND

A conventional temperature monitoring system, e.g., for detecting an overheating condition in an electronic device, includes a temperature sensor connected to associated temperature measurement circuitry, for example circuitry to convert a voltage of the temperature sensor to a temperature value.

One common type of temperature sensor is a thermocouple. A typical thermocouple includes two dissimilar electrical conductors forming a pair of electrical junctions, referred to as a hot junction (or measurement junction) and a cold junction (or reference junction). A thermocouple produces a temperature-dependent voltage (also referred to as electromotive force (EMF)) as a result of the Seebeck effect. The temperature measurement circuitry of the respective system converts this voltage to a temperature value.

There is a need for an improved thermocouple based temperature monitoring system, for example for monitoring temperatures associated with an integrated circuit device. For example, there is a need for an integrated temperature monitoring system, e.g., including a thermocouple and associated temperature measurement circuitry both integrated in an IC device.

SUMMARY

The present disclosure provides an integrated (or "on-chip") thermocouple device formed in an integrated circuit (IC) device, and including a first metal component and a second metal component formed from two different materials (e.g., constantan and copper) that define a pair of thermocouple junctions (e.g., a reference junction and a measurement junction). The present disclosure also provides an integrated temperature monitoring system including an example integrated thermocouple device and integrated monitoring circuitry to detect a voltage between the pair of thermocouple junctions, and determine temperature data as a function of the detected voltage. In some examples, the integrated temperature monitoring system may provide real-time measuring of temperatures in a chip, e.g., to detect over-heating of high-performance transistors, processors, or other IC devices. In some examples, the integrated temperature monitoring system may be constructed at lower cost and with a smaller form factor than conventional designs.

One aspect provides a system including a metal tub structure formed in an integrated circuit (IC) structure, a first metal component, and a second metal component. The first metal component is formed from a first metal. The first metal component is formed in an opening defined by the metal tub structure, and includes a first metal first junction element, a first metal second junction element, and a first metal bridge electrically connected to the first metal first junction element and the first metal second junction element. The second metal component is formed from a second metal different than the first metal, and includes a second metal first junction element electrically connected to the first metal first junction element to define a first thermocouple junction, and a second metal second junction element electrically connected to the first metal second junction element to define a second thermocouple junction.

In one example, the first thermocouple junction comprises a reference junction, and the second thermocouple junction comprises a measurement junction.

In one example, the system includes monitoring circuitry electrically connected to the second metal first junction element and the second metal second junction element. In one example, the monitoring circuitry includes circuitry to detect a voltage and determine temperature data as a function of the detected voltage.

In one example, the metal tub structure comprises tungsten, the first metal comprises constantan, and the second metal comprises copper.

In one example, the metal tub structure is formed in a pre-metal dielectric region, and the second metal first junction element and second metal second junction element are formed in a first metal interconnect layer over the pre-metal dielectric region.

In one example, the second metal component includes a second metal first connection element and a second metal second connection element formed over the second metal first junction element and second metal second junction element. The second metal first connection element is electrically connected to the second metal first junction element, and the second metal second connection element is electrically connected to the second metal second junction element. The system may include monitoring circuitry including a voltage sensor electrically connected to the second metal first connection element and the second metal second connection element.

In one example, the system includes a dielectric liner formed between the first metal component and the metal tub structure.

In one example, a lateral length of the first metal bridge in a first direction extending from the first metal first junction element to the first metal second junction element is at least five times a lateral width of the first metal bridge in a second direction orthogonal to the first direction.

One aspect provides an IC device including a dielectric region, a metal layer formed over the dielectric region, an IC structure, a thermocouple device, and monitoring circuitry. The IC structure includes a vertically-extending IC structure contact formed in the dielectric region, and an IC structure connection element formed in the metal layer and electrically connected to the vertically-extending IC structure contact. The thermocouple device includes a metal tub structure formed in the dielectric region, a first metal component formed in the metal tub and including a pair of first metal first junction elements electrically connected to each other by a first metal bridge, and a second metal component including a pair of second metal junction elements formed in the metal layer, wherein individual ones of the pair of second metal junction elements are electrically connected to respective individual ones of the pair of first metal junction elements, to define a pair of thermocouple junctions. The monitoring circuitry is electrically connected to the pair of thermocouple junctions.

In one example, the monitoring circuitry comprises circuitry to detect a voltage and determine temperature data as a function of the detected voltage.

In one example, the vertically-extending IC structure contact and the metal tub structure comprise respective portions of a common metal layer.

In one example, the vertically-extending IC structure contact and the metal tub structure comprise tungsten, the first metal component comprises constantan, and the second metal component comprises copper.

In one example, the IC structure comprises a transistor structure; and wherein the vertically-extending IC structure contact defines an electrical contact to the transistor structure.

In one example, the dielectric region comprises a pre-metal dielectric region, and the metal layer comprises a first metal interconnect layer.

In one example, the IC device includes a dielectric liner formed between the first metal component and the metal tub structure.

One aspect provides a method, including forming a first metal component opening in a dielectric region of an integrated circuit (IC) structure, depositing a conformal metal over the dielectric region and extending down into the first metal component opening to define a conformal metal tub structure in the first metal component opening, depositing a first metal over the conformal metal and at least partially filling an opening defined by the conformal metal tub structure, performing a planarization process to remove upper portions of the conformal metal and first metal, wherein a remaining portion of the first metal defines a first metal component in the conformal metal tub structure, the first metal component including a pair of first metal junction elements electrically connected to each other by a first metal bridge, and forming a pair of second metal junction elements from a second metal different than the first metal, wherein the pair of second metal junction elements are electrically connected to the pair of first metal junction elements, respectively, to define a pair of thermocouple junctions.

In one example, the method includes forming integrated monitoring circuitry in the IC structure, the integrated monitoring circuitry electrically connected to the second metal first junction element and the second metal second junction element.

In one example, the method includes forming a IC contact opening in the dielectric region concurrently with the first metal component opening, wherein the deposited conformal metal extends down into the IC contact opening to define a vertically-extending IC structure contact, and forming an IC structure connection element from the second metal concurrently with the pair of second metal junction elements.

In one example, the method includes depositing a dielectric liner over the conformal metal tub structure in the first metal component opening, and depositing the first metal over the dielectric liner, wherein the dielectric liner is arranged between the first metal component and the conformal metal tub structure.

BRIEF DESCRIPTION OF THE DRAWINGS

Example aspects of the present disclosure are described below in conjunction with the figures, in which:

FIG. 1A is a top view, and FIGS. 1B and 1C are cross-sectional side views, of an example integrated thermocouple device formed in an integrated circuit (IC) device;

FIG. 2A is a top view, and FIGS. 2B and 2C are cross-sectional side views, of an example integrated thermocouple device including an optional dielectric liner;

FIG. 3 is cross-sectional side view of an example IC device including a temperature monitoring system including the example integrated thermocouple device of FIGS. 1A-1c or the example integrated thermocouple device of FIGS. 2A-2C;

FIGS. 5-13 illustrate an example process for forming the example temperature monitoring system shown in FIG. 4.

Figure 4:
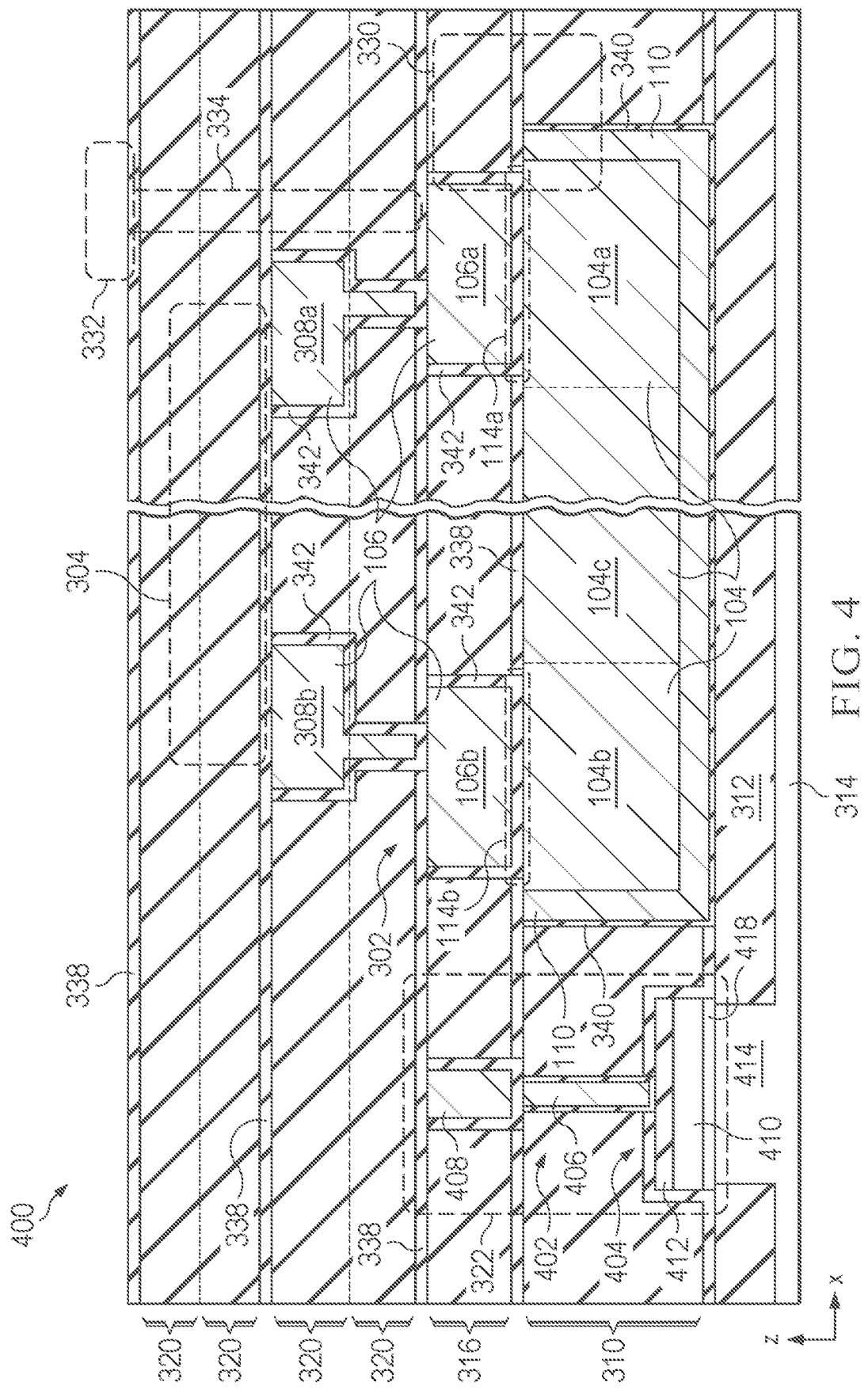
FIG. 4 is cross-sectional side view of an example IC device including a temperature monitoring system including an example integrated thermocouple device formed concurrently with at least one separate IC structure.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

FIG. 1A (top view), FIG. 1B (cross-sectional side view through line 1B-1B shown in FIG. 1A), and FIG. 1C (cross-sectional side view through line 1C-1C shown in FIG. 1A) show an example integrated thermocouple device 100 formed in an IC device 102. The example integrated thermocouple device 100 includes a first metal component 104 formed from a first metal and a second metal component 106 formed from a second metal different than the first metal. The first metal component 104 may include a first metal first junction element 104a and a first metal second junction element 104b (i.e., a pair of first metal first junction elements) and a first metal bridge 104c physically and electrically connecting the first metal first junction element 104a with the first metal second junction element 104b.

Figure 8A:
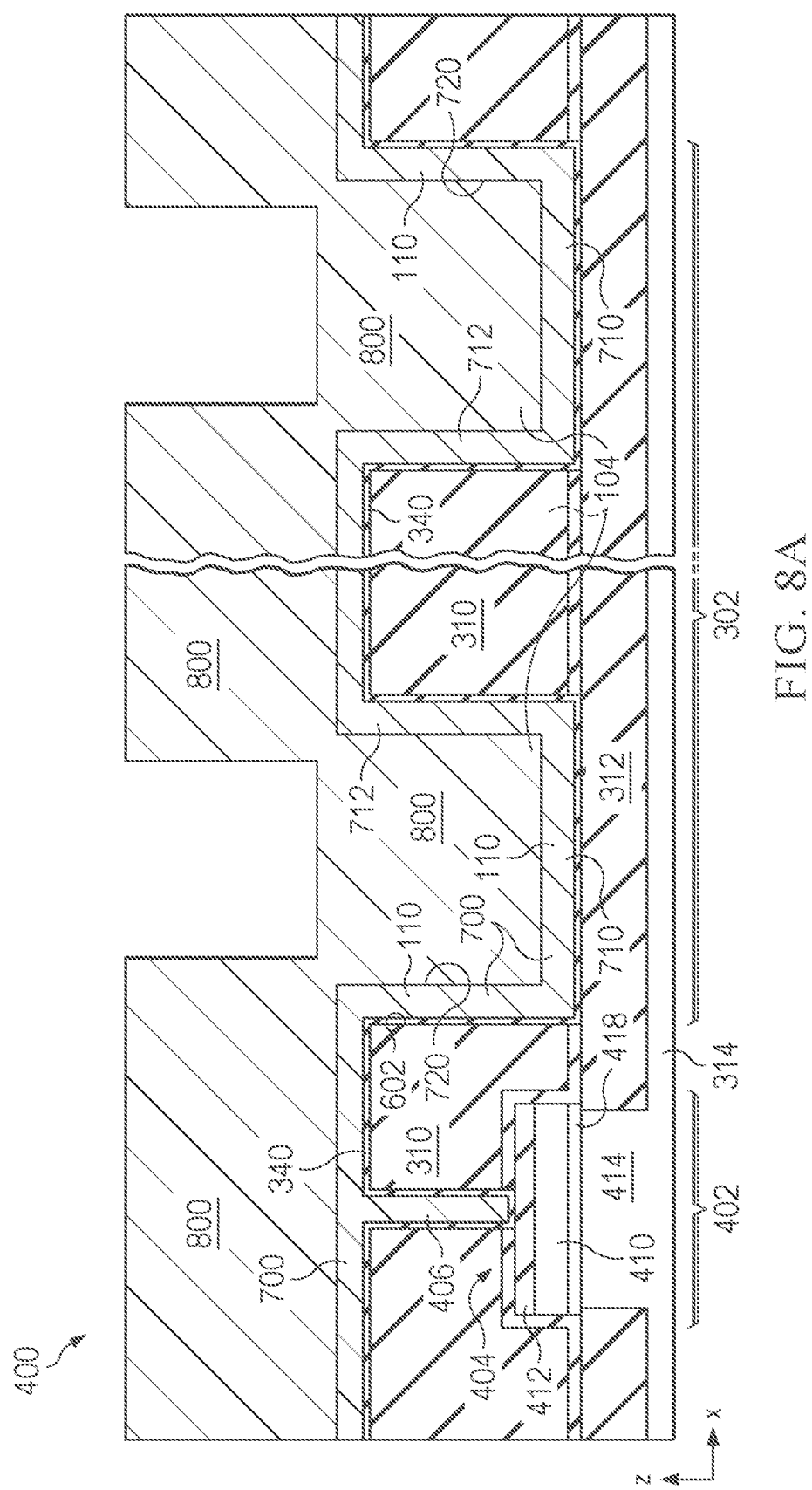

The first metal component 104 may be formed in a metal tub structure 110, the metal tub structure 110 formed from a conformal metal, for example tungsten. In particular, the first metal component 104 may be formed in an opening 112 defined by the metal tub structure 110. In this example, the first metal component 104 may be formed directly on the metal tub structure 110, e.g., by depositing the first metal of the first metal component 104 directly on the conformal metal of the metal tub structure 110, for example as shown in FIG. 8A discussed below. In other examples, an optional dielectric liner may be formed between the metal tub structure 110 and the first metal component 104, e.g., as shown in FIGS. 2A-2B discussed below.

The second metal component 106 may include a second metal first junction element 106a and a second metal second junction element 106b (i.e., a pair of second metal first junction elements) spaced apart from the second metal first junction element 106a. The second metal first junction element 106a is electrically connected to the first metal first junction element 104a to define a first thermocouple junction 114a, which may be called a reference junction 114a, and the second metal second junction element 106b is electrically connected to the first metal second junction element 104b to define a second thermocouple junction 114b, which may be called a measurement junction 114b. The first and second thermocouple junctions 114a and 114b define a pair of thermocouple junctions. In some examples, as discussed more in below regarding FIG. 3, the first thermocouple junction 114a defines a reference junction thermally coupled to a reference thermal reservoir, and the second thermocouple junction 114b defines a measurement junction thermally coupled to an object or location to be monitored, e.g., an internal object (e.g., power transistors) or location in the IC device 102 or alternatively an object or location external to the IC device 102.

The first metal component 104 is formed from a first metal and the second metal component 106 formed from a second metal different than the first metal, wherein the first metal and second metal, being electrically connected to define the first and second thermocouple junctions 114a and 114b, produce a temperature-dependent voltage (or EMF), e.g., as a result of the Seebeck effect. As used herein, the first metal component 104 being "formed from" the first metal means the first metal component 104 is formed from at least the first metal (e.g., the first metal alone, or the first metal and at least one additional metal), and the second metal component 106 being "formed from" a second metal means the second metal component 106 is formed from at least the second metal (e.g., the second metal alone, or the second metal and at least one additional metal). As used herein the term "metal" includes alloys, and is not restricted to an elemental metal.

In one example, the first metal comprises constantan and the second metal comprises copper, to define a copper-constantan thermocouple (or "type T" thermocouple) having a Seebeck coefficient of 40.6 μV/° C. at 25° C. Constantan is a Cu—Ni alloy, consisting of about 55% copper and 45% nickel. As indicated above, the metal tub structure 110 may comprise tungsten or other conformal metal.

The reference junction 114a may be thermally coupled to a reference thermal reservoir (e.g., the reference junction 114a may be located at a reference thermal reservoir or thermally coupled to a reference thermal reservoir by a conductive connection), and the measurement junction 114b may thermally coupled to an object or location to be monitored (e.g., the measurement junction 114b may be located at or proximate the object or location to be monitored, or thermally coupled to the object or location to be monitored by a conductive connection). The integrated thermocouple device 100 may be formed such that the reference thermal reservoir (thermally coupled to the reference junction 114a) is thermally isolated or independent from the object or location to be monitored (thermally coupled to the measurement junction 114b), such that temperature changes at the object or location to be monitored do not significantly influence the temperature at the reference thermal reservoir. In some examples, the measurement junction 114b and reference junction 114a may be located relatively distant from each other, e.g., at least 100 μm, at least 1 mm, at least 1 cm, at least 10 cm apart.

In addition, a thermal mass of the first metal bridge 104c connecting the first metal first junction element 104a with the first metal second junction element 104b may be insignificant relative to a thermal mass of the reference thermal reservoir (thermally coupled to the reference junction 114a) and a thermal mass of the object or location to be monitored (thermally coupled to the measurement junction 114b), e.g., as a result of the shape and size of the first metal bridge 104c. In some examples, with reference to FIGS. 1A-1C, a length $L_{104c}$ of the first metal bridge 104c in a lateral direction (x-direction) extending between the first metal first junction element 104a and first metal second junction element 104b may be at least 100 times, at least 1000 times, or at least 10,000 times a width $W_{104c}$ of the first metal bridge 104c in a lateral direction (y-direction) perpendicular to the direction of the length $L_{104c}$, and the length $L_{104c}$ of the first metal bridge 104c may be at least 100 times, at least 1000 times, or at least 10,000 times a thickness $T_{104c}$ (see FIG. 1C) of the first metal bridge 104c in a vertical direction (z-direction). In some examples, the length $L_{104c}$ of the first metal bridge 104c may be at least 100 μm, at least 1 mm, at least 1 cm, at least 10 cm, and a cross-sectional area of the first metal bridge 104c (width $W_{104c}$ times thickness $T_{104c}$) may be in the range of about 1 μm² to 10 μm².

In some examples, e.g., as described in more detail below with reference to FIGS. 2A-2C, monitoring circuitry is electrically connected to the first and second thermocouple junctions 114a and 114b to detect the temperature-dependent voltage produced by the integrated thermocouple device 100. For example, monitoring circuitry may be connected to (a) a second metal first connection element coupled to the second metal first junction element 106a and (b) a second metal second connection element coupled to the second metal second junction element 106b.

In some examples, the monitoring circuitry may include a voltage sensor to detect a voltage and converter circuitry to convert the detected voltage to temperature data. In some examples, the monitoring circuitry may comprise integrated circuitry formed in the IC device 102.

In some examples, e.g., as described in more detail below with reference to FIG. 4, the integrated thermocouple device 100 may be formed concurrently with other IC structures, e.g., complementary metal-oxide-semiconductor (CMOS) transistor structures, without adding any mask operations to the baseline/background IC device manufacturing process. In some examples, the second thermocouple junction 114b (measurement junction) may thermally coupled to IC structure(s) (e.g., one or more transistors) formed concurrently with the integrated thermocouple device 100, wherein the integrated thermocouple device 100 monitors a temperature associated with such IC structure(s).

In one example, the integrated thermocouple device 100 may monitor a temperature of a transistor or group of transistors (e.g., high-current transistors), for example to detect an overheating condition (e.g., a thermal runaway condition) of the transistor(s), which may indicate a fault requiring a corrective action. The measurement junction 114b of the thermocouple device 100 may thus be formed proximate the transistor(s).

Figure 8B:
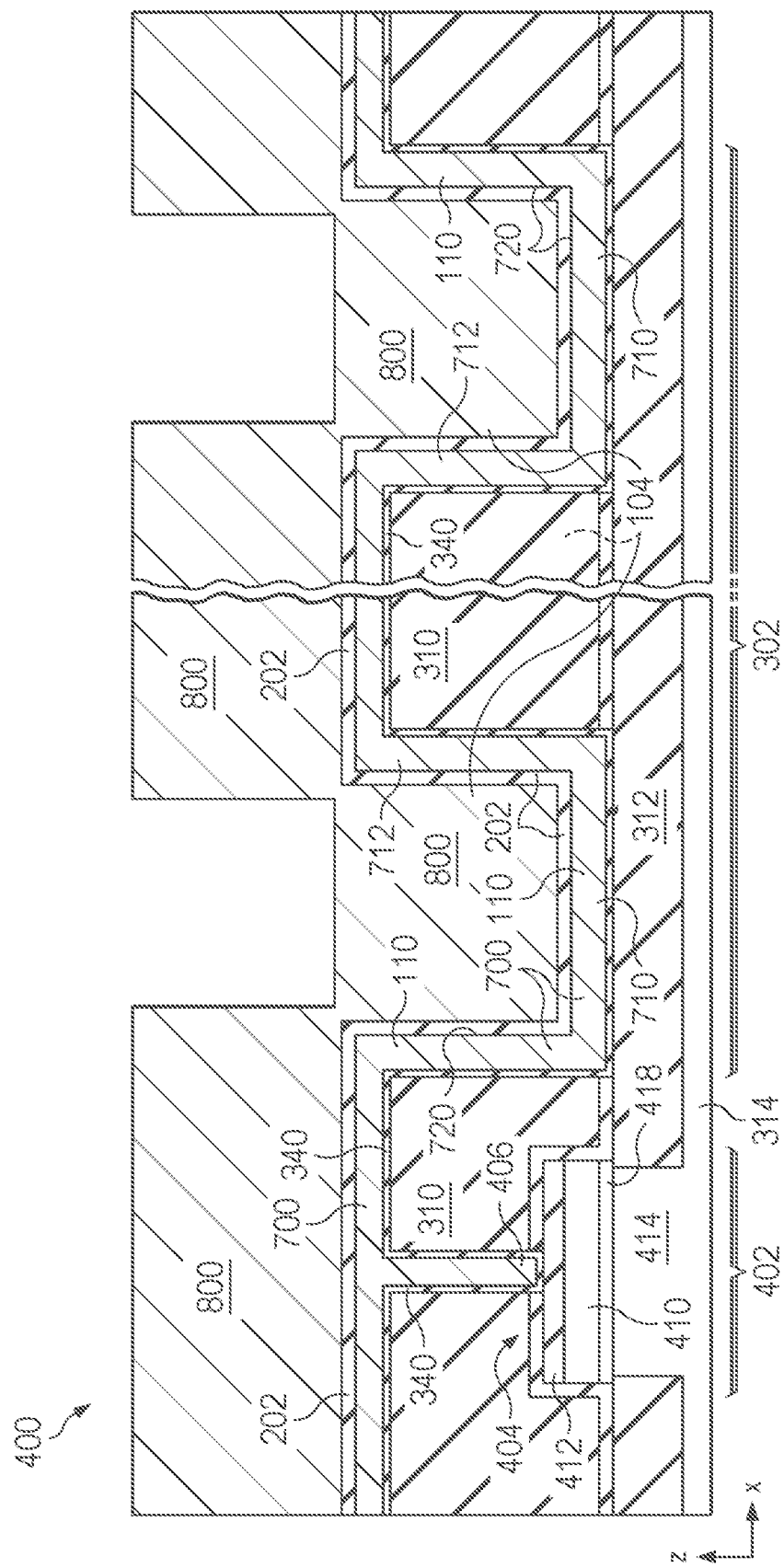

FIG. 2A (top view), FIG. 2B (cross-sectional side view through line 2B-2B shown in FIG. 2A), and FIG. 2C (cross-sectional side view through line 2C-2C shown in FIG. 2A) show an example integrated thermocouple device 200 formed in the IC device 102. The example integrated thermocouple device 200 is similar to the example integrated thermocouple device 100 shown in FIGS. 1A-1C, except the additional inclusion of an optional dielectric liner 202 (e.g., comprising silicon nitride, SiN) between the first metal component 104 and the metal tub structure 110. The dielectric liner 202 may be formed by depositing a dielectric liner layer on the metal tub structure 110, and subsequently depositing the first metal of the first metal component 104 on the dielectric liner layer, for example as shown in FIG. 8B discussed below. The dielectric liner 202 may isolate the deposited first metal component 104 (e.g., comprising constantan) from the underlying metal tub structure 110 (e.g., comprising tungsten), which may be desirable or advantageous in certain applications. The dielectric layer 202 can also serve as a diffusion barrier for the deposited first metal of the first metal component 104; accordingly the dielectric liner 202 may also be referred to as a dielectric barrier layer.

FIG. 3 is cross-sectional side view of an example IC device 300 including a temperature monitoring system 301, according to one example. The cross-sectional side view of FIG. 3 cuts through the first metal bridge 104c of the first metal component 104, e.g., corresponding with the cross-sectional side view shown in FIGS. 1C and 2C discussed above. The example temperature monitoring system 301 includes an example integrated thermocouple device 302 and associated monitoring circuitry 304 (e.g., formed at least partially in the IC device 300). The example integrated thermocouple device 302 may correspond with the example integrated thermocouple device 102 shown in FIGS. 1A-1C or the example integrated thermocouple device 200 shown in FIGS. 2A-2C. For example, the example integrated thermocouple device 302 includes the first metal component 104 formed from a first metal and the second metal component 106 formed from the second metal different than the first metal. The first metal component 104 is formed in the metal tub structure 110 formed from a conformal metal, e.g., tungsten, as discussed above, and includes the first metal first junction element 104a, first metal second junction element 104b, and first metal bridge 104c physically and electrically connecting the first metal first junction element 104a with the first metal second junction element 104b.

In the illustrated example, the first metal component 104 is formed in a pre-metal dielectric (PMD) region 310 formed over a field oxide region 312 on a wafer substrate 314 (e.g., silicon substrate).

The first metal component 104 may be formed directly on the metal tub structure 110, e.g., as shown in FIGS. 1A-1C discussed above (and also discussed below with reference to FIG. 8A), or alternatively an optional dielectric liner (not shown in FIG. 3) may be formed between the first metal component 104 and the metal tub structure 110, e.g., the optional dielectric liner 202 shown in FIGS. 2A-2C discussed above (and also discussed below with reference to FIG. 8B). In some examples, the metal tub structure 110 is formed over a liner 340, e.g., a titanium nitride (TiN) liner, e.g., as discussed below with reference to FIG. 7B.

The second metal component 106 may include the second metal first junction element 106a and the second metal second junction element 106b spaced apart from the second metal first junction element 106a. The second metal first junction element 106a is electrically connected to the first metal first junction element 104a to define the first thermocouple junction (reference junction) 114a, and the second metal second junction element 106b is electrically connected to the first metal second junction element 104b to define the second thermocouple junction (measurement junction) 114b. In the illustrated example, the second metal first junction element 106a and second metal second junction element 106b are formed in a first metal layer 316 (commonly referred to as a "metal-1" or "M1" layer) formed over the PMD region 310.

As shown in FIG. 3, the second metal component 106 may also include at least one second metal first connection element 308a and at least one second metal second connection element 308b connecting the second metal first junction element 106a and the second metal second junction element 106b, respectively, to the monitoring circuitry 304, so that the monitoring circuitry 304 is electrically connected to the reference junction 114a and the measurement junction 114b. The at least one second metal first connection element 308a and the at least one second metal second connection element 308b may include conductive elements (e.g., comprising copper and/or other metal or metals) formed in any one or more additional IC layers 320 in the IC device 300. For example, at least one second metal first connection element 308a and at least one second metal second connection element 308b may include metal structures formed in at least one metal layer (e.g., metal interconnect layer) and/or at least one via layer of the IC device 300. The at least one second metal first connection element 308a and the at least one second metal second connection element 308b may be formed from the second metal (i.e., the same metal as the second metal first junction element 106a and second metal second junction element 106b), or from one or more different metals.

Respective layers of the IC device 300, e.g., including the field oxide region 312, PMD region 310, first metal layer 316, and/or additional IC layers 320 (e.g., including metal layer(s) and/or via layer(s)) may be separated by respective etch stop layers and/or dielectric barrier layers, indicated at 338.

In some examples, the respective components of the second metal component 106, e.g., the second metal first junction element 106a, second metal second junction element 106b, second metal first connection element(s) 308a, and second metal second connection element(s) 308b may be formed over a respective barrier layer 342, e.g., a tantalum/tantalum nitride (Ta/TaN) bilayer (also discussed below with reference to FIG. 12). As shown in FIG. 3, a first barrier layer region 342a is formed at the reference junction 114a, between the second metal first junction element 106a and the underlaying first metal first junction element 104a; and a second barrier layer region 342b, is formed at the measurement junction 114b, between the second metal second junction element 106b and the underlaying first metal second junction element 104b. The first barrier layer region 342a and second barrier layer region 342b may create a respective parasitic junction at the reference junction 114a and measurement junction 114b, which may have little or no impact on the operation (e.g., temperature measurements) of the temperature monitoring system 301.

Monitoring circuitry 304 may comprise integrated circuitry formed in the IC device 300. Monitoring circuitry 304 may include a voltage sensor circuitry to detect a temperature-dependent voltage produced by the integrated thermocouple device 302. Monitoring circuitry 304 may also include temperature measurement circuitry to covert the detected temperature-dependent voltage to temperature data, e.g., temperature value(s) or other values representing temperature. In some examples, monitoring circuitry 304 may include circuitry to convert thermocouple EMF (voltage) to temperature, for example an MCP960X "Thermocouple EMF to Temperature Converter" IC device by Microchip Technology Inc.

In some examples, the integrated thermocouple device 302 and monitoring circuitry 304 are provided to monitor a temperature of an internal object or location, indicated at 322, adjacent or otherwise thermally coupled to the measurement junction 114b. The internal object or location 322 may comprise any IC element(s) that may generate heat or otherwise become heated over time, e.g., during operation or use of the IC element(s), for example one or more transistor, resistor, capacitor, inductor, diode, processor, or heat sink.

In other examples, the integrated thermocouple device 302 and monitoring circuitry 304 are provided to monitor a temperature of an external object or location, indicated at 324, for example an electronic device that generate heats or otherwise becomes heated over time. As shown, the external object or location 324 may be thermally coupled to the measurement junction 114b by conductive structures 326, e.g., metal structures extending through the IC device 300.

The reference junction 114a may be thermally coupled to an internal reference thermal reservoir, indicated at 330, or alternatively an external reference thermal reservoir, indicated at 332. The cross-sectional side view of FIG. 4 cuts through the first metal bridge 104c of the first metal component 104, e.g., corresponding with the cross-sectional side view shown in FIGS. 1C, 2C, and 3 discussed above. The internal reference thermal reservoir 330 may comprise a region of the IC device 300 adjacent the reference junction 114a, wherein such region may include dielectric materials (e.g., PMD region 310, dielectric region 317 of the metal layer 316, the wafer substrate 314, and/or other passive structures. The external reference thermal reservoir 332 may comprise a heat sink or other thermal sink or reservoir (e.g., a cooled water reservoir), and may be thermally coupled to the reference junction 114a by conductive structures 334, e.g., metal structures extending through the IC device 300.

FIG. 4 is cross-sectional side view of an example IC device 400, according to one example. The example IC device 400 represents an example of the IC device 300 shown in FIG. 3, wherein the integrated thermocouple device 302 is constructed concurrently with an example IC structure 402, e.g., using common layers, materials, and process steps for forming respective components of the integrated thermocouple device 302 and the example IC structure 402. The example IC structure 402 comprises a structure of a CMOS transistor including a transistor gate 404, a vertically-extending contact 406 (e.g., CMOS contact) electrically connected to the transistor gate 404, and an IC structure connection element 408 electrically connected to the vertically-extending contact 406. The transistor gate 404 comprises a silicided polysilicon structure including a polysilicon region 410 having a silicide layer 412 formed on an upper surface thereof. The transistor gate 404 may be formed over an active region (doped region) 414 of the silicon substrate 314 surrounded (laterally) by an STI field oxide region 312, wherein a gate oxide 418 is formed between the transistor gate 404 and active region 414.

As discussed in more detail below, the vertically-extending contact 406 (e.g., CMOS contacts) may be formed concurrently with the metal tub structure 110, e.g., from a common (same) conformal metal layer (e.g., a tungsten layer) deposited in respective openings in the PMD region 310, which may allow formation of the integrated thermocouple device 302 without adding any additional masks to the background IC fabrication process. In addition, the IC structure connection element 408 (connected to the vertically-extending contact 406) may be formed concurrently with the second metal first component 106a and second metal second component 106b, e.g., by depositing an interconnect metal (e.g., copper) in respective openings in the first metal layer 316.

FIGS. 5-13 illustrate an example process for forming the example temperature monitoring system 400 shown in FIG. 4.

Figure 5:
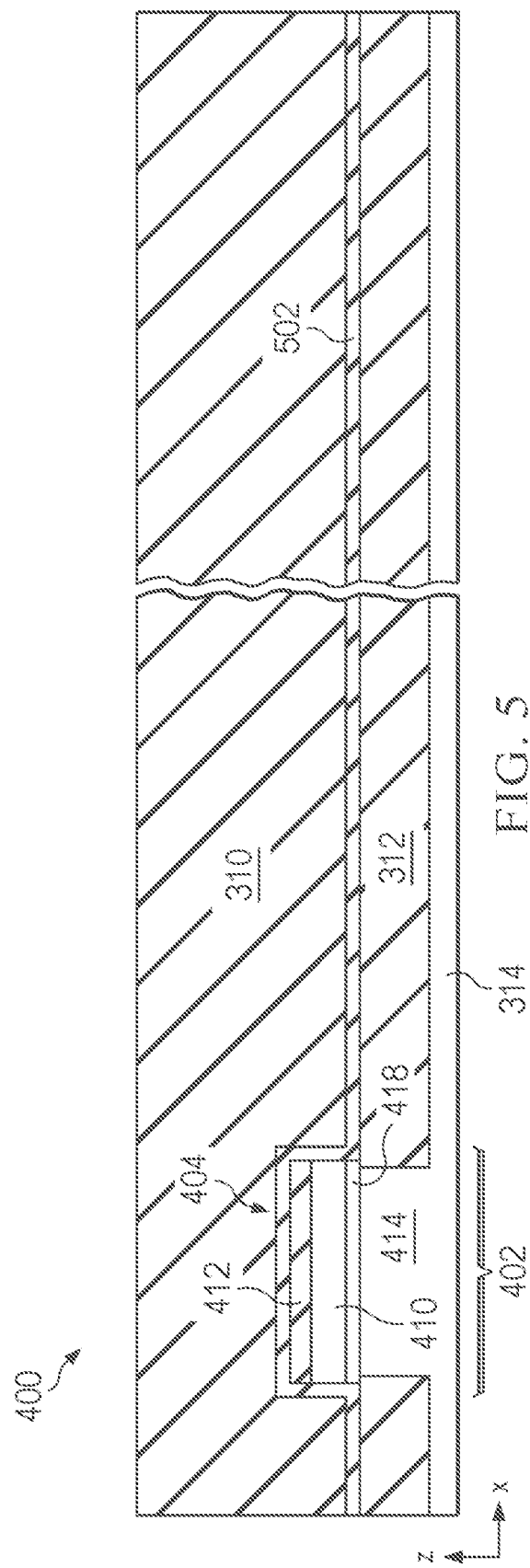

As shown in FIG. 5, the gate oxide 418 is formed on the active region 414 of the silicon substrate 314 surrounded (laterally) by the STI field oxide region 312, followed by formation of the transistor gate 404 comprising the polysilicon region 410 having a silicide layer 412 formed thereon. An optional contact etch stop layer 502 may be deposited over the STI field oxide region 312 and extending over the transistor gate 404. In some examples, the optional contact etch stop layer 502 may comprise a silicon nitride (SiN) layer deposited by plasma-enhanced chemical vapor deposition (PECVD) or other suitable deposition process, e.g., with a thickness in the range of 250-750 Å. The optional contact etch stop layer 502 may facilitate the subsequent contact etch discussed below with reference to FIGS. 6A and 6B.

The dielectric region (PMD region) 310 is deposited over the STI field oxide region 312 (or over the optional contact etch stop layer 502, if present), followed by a planarization process, e.g., a chemical mechanical planarization (CMP) process to planarize the top of the dielectric region 310. In some examples, the PMD region 310 may comprise silicon oxide ($SiO_2$), phosphorus silicate glass (PSG), borophosphosilicate glass (BPSG), or any combination thereof.

As shown in FIG. 6A (top view) and FIG. 6B (cross-sectional side view through line 6B-6B shown in FIG. 6A), a contact opening 600 (for the vertically-extending contact 406) and a first metal component opening 602 (for the metal tub structure 110 and the first metal component 104) are patterned and etched in the PMD region 310, which etch may be referred to as a contact etch. If present, the optional contact etch stop layer 502 may facilitate control of the contact etch, e.g., to allow the etch to stop on the contact etch stop layer 502 and subsequently advance through the contact etch stop layer 502 with improved process control (e.g., as compared to an example without the optional contact etch stop layer 502), e.g., to prevent the etch from penetrating through the silicide layer 412 of the transistor gate 404, which penetration may cause high contact resistance or high transistor leakage.

The first metal component opening 602 may be a tub opening including first and second junction element regions 602a and 602b connected by a bridge region 602c, forming a dog-bone shape. In some examples, the contact opening 600 has a lateral width in each of the x-direction and y-direction, indicated as $W_{600x}$ and $W_{600y}$, respectively, in the range of 0.1-0.5 µm. In contrast, the first metal component opening 602 is substantially larger, e.g., with first junction element region 602a, second junction element region 602b, and bridge region 602c having respective dimensions of at least 1 µm or at least 10 µm in the x-direction, and y-direction. A width $W_{602c}$ (y-direction) of the bridge region 602c may be greater than two times a thickness of a subsequently deposited conformal metal layer 700 (see FIG. 7, discussed below), to allow sufficient room to form the first metal bridge 104c.

In some examples, a length $L_{602c}$ (x-direction) of the bridge region 602c is substantially greater (e.g., at least 100 times greater, at least 1000 times greater, at least 10,000 times greater) than both the width $W_{602c}$ (y-direction) of the bridge region 602c and a vertical depth $T_{602c}$ (z-direction) of the bridge region 602c. In some examples, the length $L_{602c}$ (x-direction) of the bridge region 602c may be at least 100 µm, at least 1 mm, at least 1 cm, or at least 10 cm.

As shown in FIG. 7A (top view) and FIG. 7B (cross-sectional side view through line 7B-7B in FIG. 7A), the liner 340 (e.g., a TiN liner) may be deposited over the PMD region 310 and extends down into the contact opening 600 and first metal component opening 602. A conformal metal layer 700 may be deposited over the liner 340 and extends down into the contact opening 600 and first metal component opening 602. In some examples the conformal metal layer 700 comprises tungsten (W) deposited by PECVD or other suitable deposition process with a thickness of less than 5000 Å, for example to avoid potential tungsten peeling or breakage of the silicon wafer (e.g., during a subsequent CMP process step). For example, the conformal metal layer 700 (e.g., tungsten layer) may be deposited with a thickness in the range of 1000-5000 Å, and in some examples in the range of 2000-3000 Å. The conformal metal layer 700 may completely fill the contact opening 600 to define the vertically-extending contact 406 of the IC structure 402, and partially fill the first metal component opening 602 to define the metal tub structure 110 in the first metal component opening 602. Accordingly, the conformal metal layer 700 enables the concurrent formation of the vertically-extending contact 406 of the IC structure 402 and the metal tub structure 110 of the integrated thermocouple device 302.

As shown, the metal tub structure 110 has a concave tub shape including a laterally-extending metal tub structure base 710 and vertically-extending metal tub structure sidewalls 712 extending upwardly from the laterally-extending metal tub structure base 710 along an outer perimeter (e.g., in the x-y plane shown in FIG. 7A) of the laterally-extending metal tub structure base 710. The vertically-extending metal tub structure sidewalls 712 extend around the full outer perimeter of the laterally-extending metal tub structure base 710 to form a closed-loop structure having a dog-bone shape as shown in FIG. 7A. The laterally-extending metal tub structure base 710 and vertically-extending metal tub structure sidewalls 712 collectively define a dog-bone shaped metal tub structure interior opening 720 in which the optional dielectric liner 202 (shown in FIGS. 2A-2C discussed above and FIG. 8B discussed below) and the first metal component 104 are subsequently formed.

As discussed above, in some examples the first metal component 104 may be formed directly on the metal tub structure 110, while in other examples a dielectric liner 202 may be formed between the first metal component 104 and the metal tub structure 110.

FIG. 8A shows an example in which the first metal component 104 is formed directly on the metal tub structure 110. As shown in FIG. 8A, a first metal layer 800 is deposited directly on the conformal metal layer 700 defining the metal tub structure 110, wherein the deposited first metal layer 800 forms the first metal component 104 in the dog-bone shaped metal tub structure interior opening 720 defined by the metal tub structure 110. In some examples, the first metal layer 800 may comprise Constantan (about 55% Cu-45% Ni Alloy), which may be deposited by a PVD (Physical Vapor Deposition) process with a thickness that fills a full vertical (z-direction) depth of the first metal component opening 602.

FIG. 8B shows an example (alternatively to the example shown in FIG. 8A) in which the optional dielectric liner 202 is formed between the first metal component 104 and the metal tub structure 110. As shown in FIG. 8B (cross-sectional side view), the dielectric liner 202 is deposited on the conformal metal layer 700 defining the metal tub structure 110, followed by deposition of the first metal layer 800 on the dielectric liner 202. In some examples, the dielectric liner 202 may comprise silicon nitride (SiN) deposited with a thickness in the range of 250-750 Å. As mentioned above, the dielectric liner 202 may isolate the deposited first metal 800 (e.g., Constantan) from the underlying conformal metal 700 (e.g., tungsten), which may be desirable or advantageous in certain applications. The optional dielectric layer 202 can also serve as a diffusion barrier for the deposited first metal of the first metal layer 800.

Figure 9A:
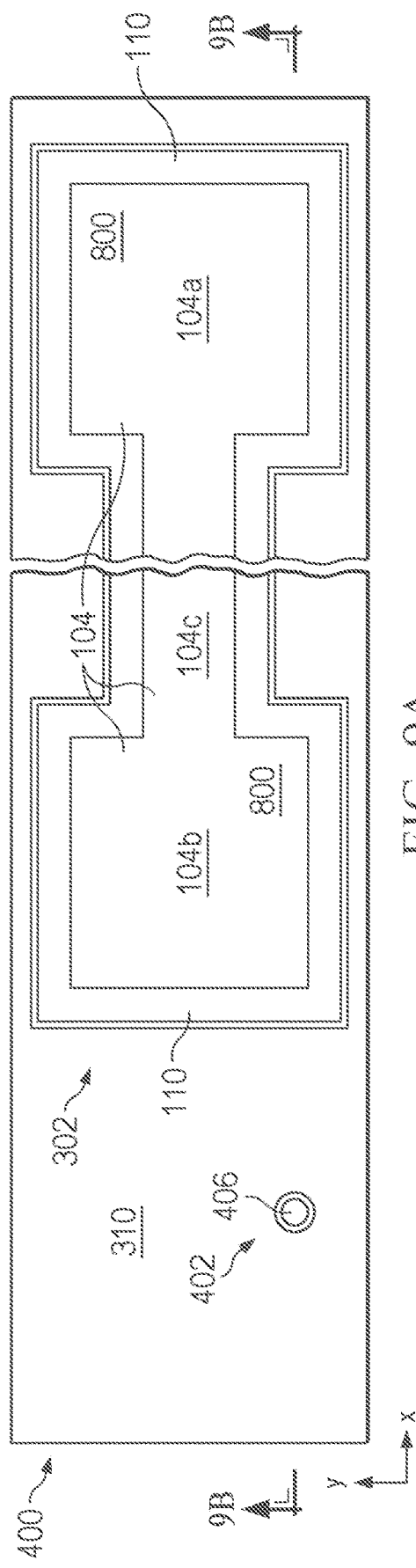
Figure 9B:
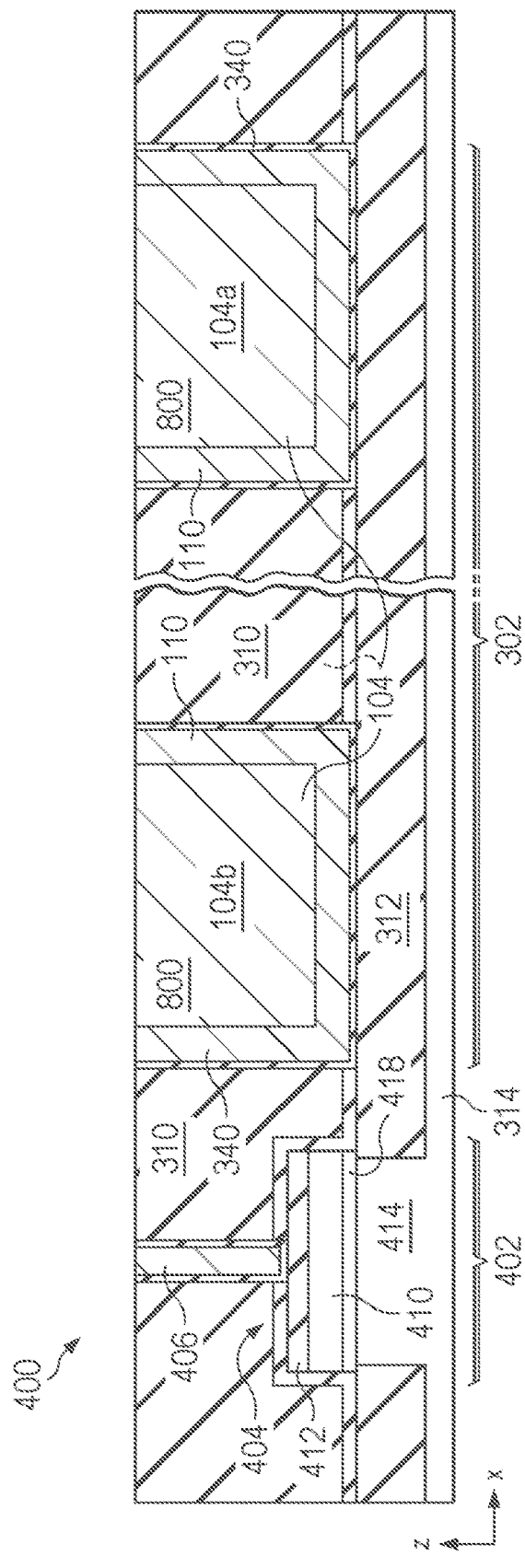

As shown in FIG. 9A (top view) and FIG. 9B (cross-sectional side view through line 9B-9B in FIG. 9A), a planarization process (e.g., a CMP process) is performed to remove upper portions of the first metal 800, optional dielectric liner 202 (not shown), and conformal metal layer 700 extending outside (i.e., above) the contact opening 600 and first metal component opening 602, leaving the vertically-extending contact 406 in the contact opening 600, and the metal tub structure 110, optional dielectric liner 202 (not shown), and first metal component 104 (including the first metal first junction element 104a, first metal second junction element 104b, and first metal bridge 104c) in the first metal component opening 602.

Figure 10:
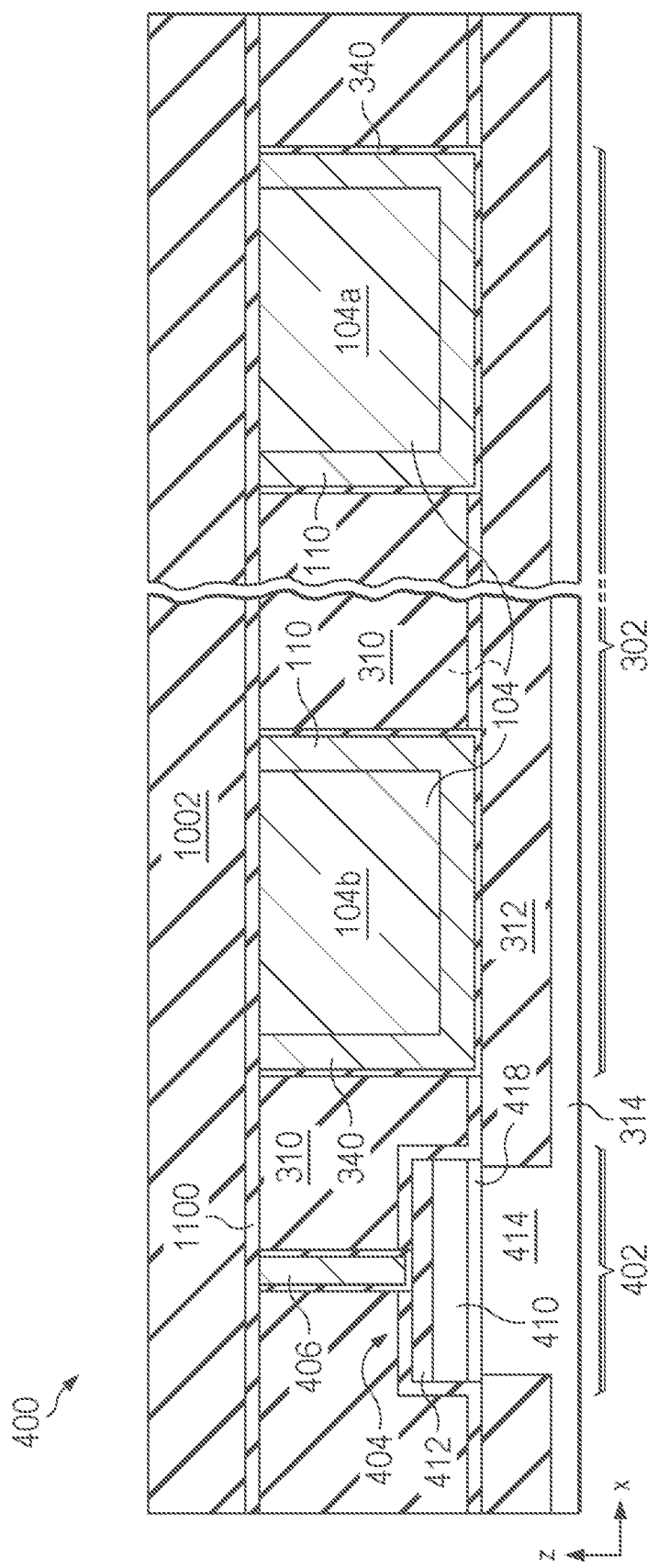

As shown in FIG. 10, an etch top layer 1000, e.g., comprising silicon nitride (SiN) or silicon carbide (SiC) with a thickness in the range of 250-750 Å, may be deposited (e.g., as part of the background/baseline IC fabrication process). The etch top layer 1000 may also act as a diffusion barrier for the underlying first metal component. A dielectric layer 1002 may then be deposited on the etch top layer 1000, e.g., comprising oxide, FSG (Fluoro-Silicate Glass), OSG (Organo-Silicate Glass), porous OSG, or other low-k material (e.g., having a dielectric constant below 4.0).

Figure 11:
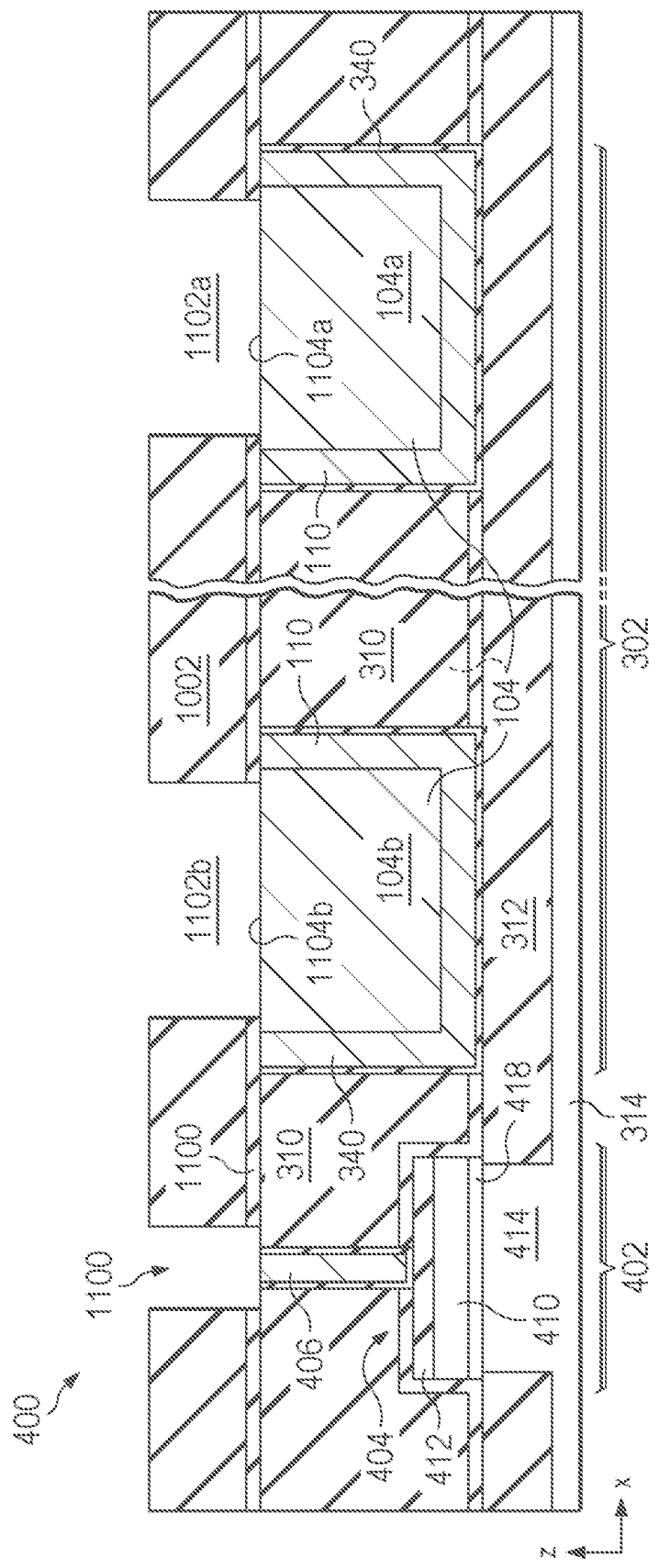

As shown in FIG. 11, a pattern and etch process (e.g., a trench pattern and etch) is performed to create an IC connection element opening 1100 and a pair of second metal junction element openings 1102a and 1102b exposing respective upper surfaces 1104a and 1104b of the first metal first junction element 104a and first metal second junction element 104b.

Figure 12:
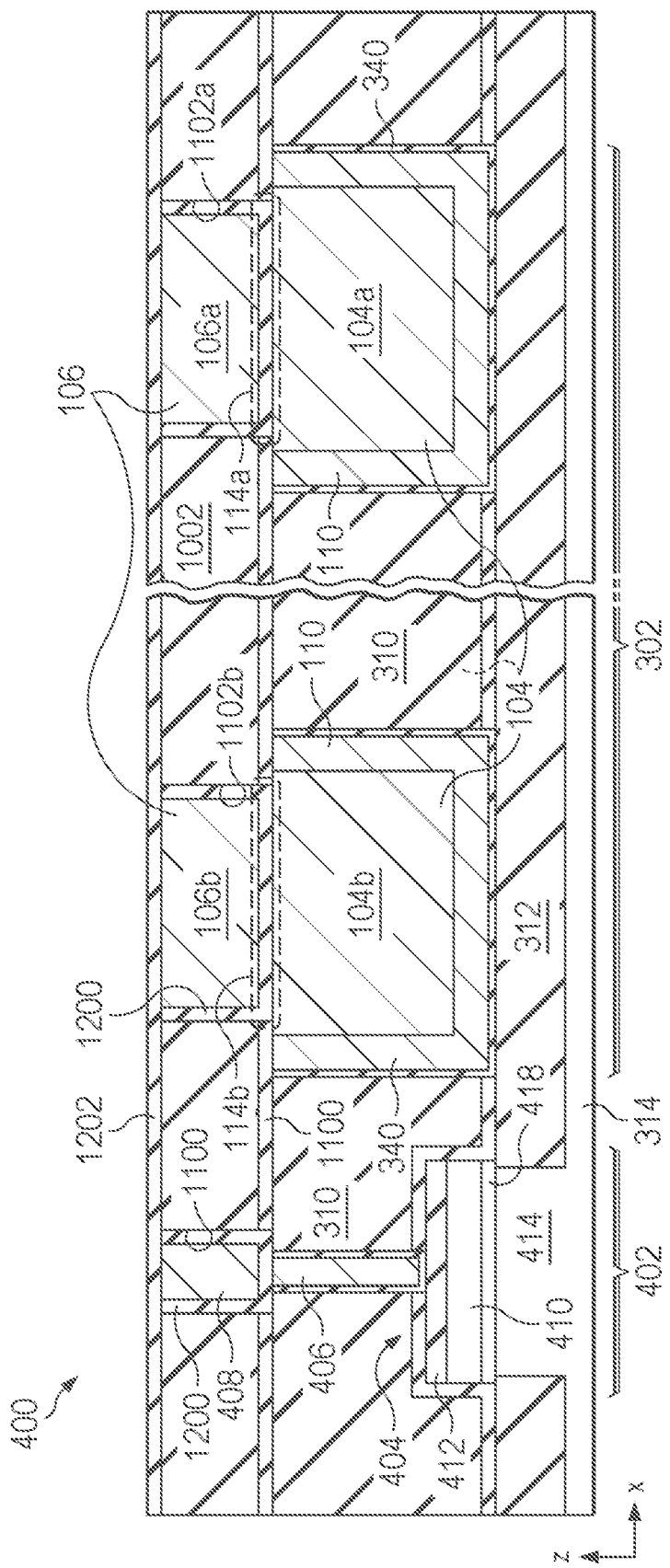

As shown in FIG. 12, the IC structure connection element 408 and the second metal first junction element 106a and second metal second junction element 106b are formed. In one example, a conductive barrier layer 1200 (e.g., a tantalum/tantalum nitride (Ta/TaN) bilayer) is deposited in the IC connection element opening 1100 and second metal junction element openings 1102a and 1102b, followed by a copper seed deposition, a copper plating process, a copper anneal process, and a planarization (e.g., CMP) process, to form (a) the IC structure connection element 408 in the IC structure connection element opening 1100 and (b) the second metal first junction element 106a and second metal second junction element 106b in the second metal junction element openings 1102a and 1102b, respectively. A dielectric barrier layer 1202, e.g., comprising SiN or SiC with a thickness in the range of 250-750 Å, may be deposited over the IC structure connection element 408 and the second metal first junction element 106a and second metal second junction element 106b.

The IC structure connection element 408 is conductively connected to the vertically-extending contact 406, e.g., through a respective portion of the conductive barrier layer 1100, which was etched away as described above in relation to FIG. 11, and the second metal first junction element 106a and second metal second junction element 106b are conductively connected to the first metal first junction element 104a and first metal second junction element 104b, respectively, through respective portions of the conductive barrier layer 1100, which were etched away as described above in relation to FIG. 11.

Figure 13:
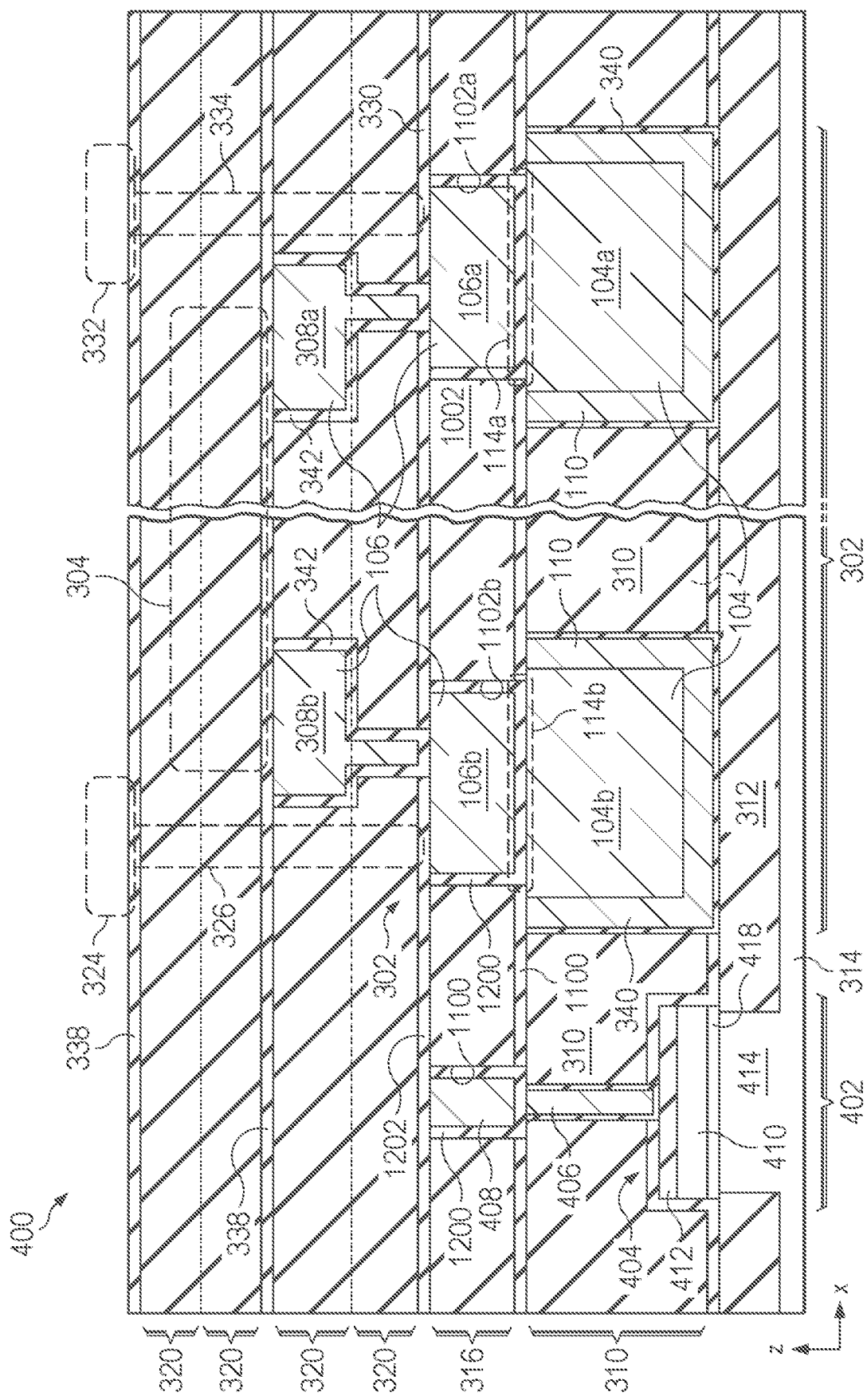

As shown in FIG. 13, additional elements of the second metal component 106 may be formed, e.g., in at least one IC layer 320 (e.g., including at least one metal layer and/or via layer), in some examples concurrently with formation of additional IC interconnect structures and/or other IC structures. For example, the second metal first junction element 308a and second metal second junction element 308b (i.e., elements of the second metal component 106) may be formed using a dual damascene process. In addition, the monitoring circuitry 304 may be formed in respective IC layers 320. In some examples, (optional) conductive structures 326 for connection to an (optional) external object or location 324 and/or (optional) conductive structures 334 for connection to an (optional) external reference thermal reservoir 332 may be formed in respective IC layers 320, and the (optional) external object 324 may be mounted to the IC device 400 in thermal communication with the (optional)

conductive structures 326 and/or the (optional) external reference thermal reservoir 332 may be mounted to the IC device 400 in thermal communication with the (optional) conductive structures 334.

Although example embodiments have been described above, other variations and embodiments may be made from this disclosure without departing from the spirit and scope of these embodiments.

The invention claimed is:

1. A system, comprising:
   a metal tub structure formed in an integrated circuit (IC) structure;
   a first metal component formed from a first metal, the first metal component formed in an opening defined by the metal tub structure, the first metal component including:
      a first metal first junction element;
      a first metal second junction element; and
      a first metal bridge electrically connected between the first metal first junction element and the first metal second junction element; and
   a second metal component formed from a second metal different than the first metal, the second metal component including:
      a second metal first junction element electrically connected to the first metal first junction element to define a first thermocouple junction; and
      a second metal second junction element electrically connected to the first metal second junction element to define a second thermocouple junction.

2. The system of claim 1, comprising a monitoring circuitry electrically connected to the second metal first junction element and the second metal second junction element.

3. The system of claim 1, wherein:
   the metal tub structure comprises tungsten;
   the first metal comprises Constantan; and
   the second metal comprises Copper.

4. The system of claim 1, wherein:
   the metal tub structure is formed in a pre-metal dielectric region; and
   the second metal first junction element and the second metal second junction element are formed in a first metal interconnect layer over the pre-metal dielectric region.

5. The system of claim 1, the second metal component comprising:
   a second metal first connection element and a second metal second connection element formed over the second metal first junction element and the second metal second junction element respectively;
   wherein the second metal first connection element is electrically connected to the second metal first junction element, and the second metal second connection element is electrically connected to the second metal second junction element; and
   the system comprising monitoring circuitry including a voltage sensor electrically connected to the second metal first connection element and the second metal second connection element.

6. The system of claim 1, comprising a dielectric liner formed between the first metal component and the metal tub structure.

7. The system of claim 1, wherein a lateral length of the first metal bridge in a first direction extending from the first metal first junction element to the first metal second junction element is at least five times a lateral width of the first metal bridge in a second direction orthogonal to the first direction.

8. The system of claim 1, wherein the first thermocouple junction comprises a reference junction, and the second thermocouple junction comprises a measurement junction.

9. The system of claim 8, wherein the monitoring circuitry comprises circuitry to detect a voltage between the first thermocouple junction and the second thermocouple junction and determine temperature data as a function of the detected voltage.

10. The system of claim 1, wherein:
    the metal tub structure is formed in a dielectric region;
    the second metal first junction element and the second metal second junction element are formed in a metal layer formed over the dielectric region; and
    the IC structure comprises:
       a vertically-extending IC structure contact formed laterally spaced apart from the metal tub structure in the dielectric region; and
       an IC structure connection element formed in the metal layer and electrically connected to the vertically-extending IC structure contact.

11. The system of claim 10, wherein the vertically-extending IC structure contact and the metal tub structure comprise respective portions of a common metal layer.

12. The system of claim 10, wherein:
    the vertically-extending IC structure contact and the metal tub structure comprise tungsten;
    the first metal component comprises constantan; and
    the second metal component comprises copper.

13. The system of claim 10, wherein the IC structure comprises a transistor structure; and wherein the vertically-extending IC structure contact is electrically connected to the transistor structure.

14. The system of claim 10, wherein:
    the dielectric region comprises a pre-metal dielectric region; and
    the metal layer comprises a first metal interconnect layer.

* * * * *